United States Patent [19]
Vermeer

[11] 3,837,159
[45] Sept. 24, 1974

[54] MACHINE FOR FORMING A ROUND BALE OF A WINDROWED MATERIAL

[76] Inventor: Gary J. Vermeer, Box 200, Pella, Iowa 50219

[22] Filed: Nov. 23, 1973

[21] Appl. No.: 418,554

[52] U.S. Cl.................................. 56/341, 100/88
[51] Int. Cl............................................ A01d 39/00
[58] Field of Search.......... 56/341, 342, 343; 100/1, 100/2, 35, 76, 88, 90, 5

[56] References Cited
UNITED STATES PATENTS

| 798,969 | 9/1905 | Luebben | 100/71 |
|---|---|---|---|
| 2,096,990 | 10/1937 | Luebben | 100/88 |
| 2,336,491 | 12/1943 | Luebben | 100/5 |
| 2,581,542 | 1/1952 | Kolzing | 56/343 |
| 2,627,223 | 2/1953 | Berge | 100/88 X |
| 3,722,197 | 3/1973 | Vermeer | 56/341 |

OTHER PUBLICATIONS
"New Roto-Boler Built by Allis-Chalmers" pages 1, 2, 6, 7, 9 and The Book Cover Page.

Primary Examiner—Russell R. Kinsey
Attorney, Agent, or Firm—Rudolph L. Lowell

[57] ABSTRACT

The invention provides a machine for making large round bales wherein hay is delivered to one end of a horizontal conveyor and rolled thereon in a bale forming zone by a series of roller-supported continuous belts. A lower roller for the series of belts is movable to progressively expand the bale forming zone in response to the progressive enlargement of a bale being formed. This movement of the lower roller takes place in a path longitudinally of and adjacent the upper surface of the horizontal conveyor to a completed bale forming position wherein the roller is located outwardly from but adjacent to the other end of the conveyor with the lower side portion thereof located below the upper surface of the conveyor. The series of belts at the lower roller are thus in a continuous adjacent working clearance with the conveyor whereby hay dropping onto the conveyor is continuously fed into the bale forming zone and prevented from being carried below such roller for discharge to the ground.

4 Claims, 9 Drawing Figures

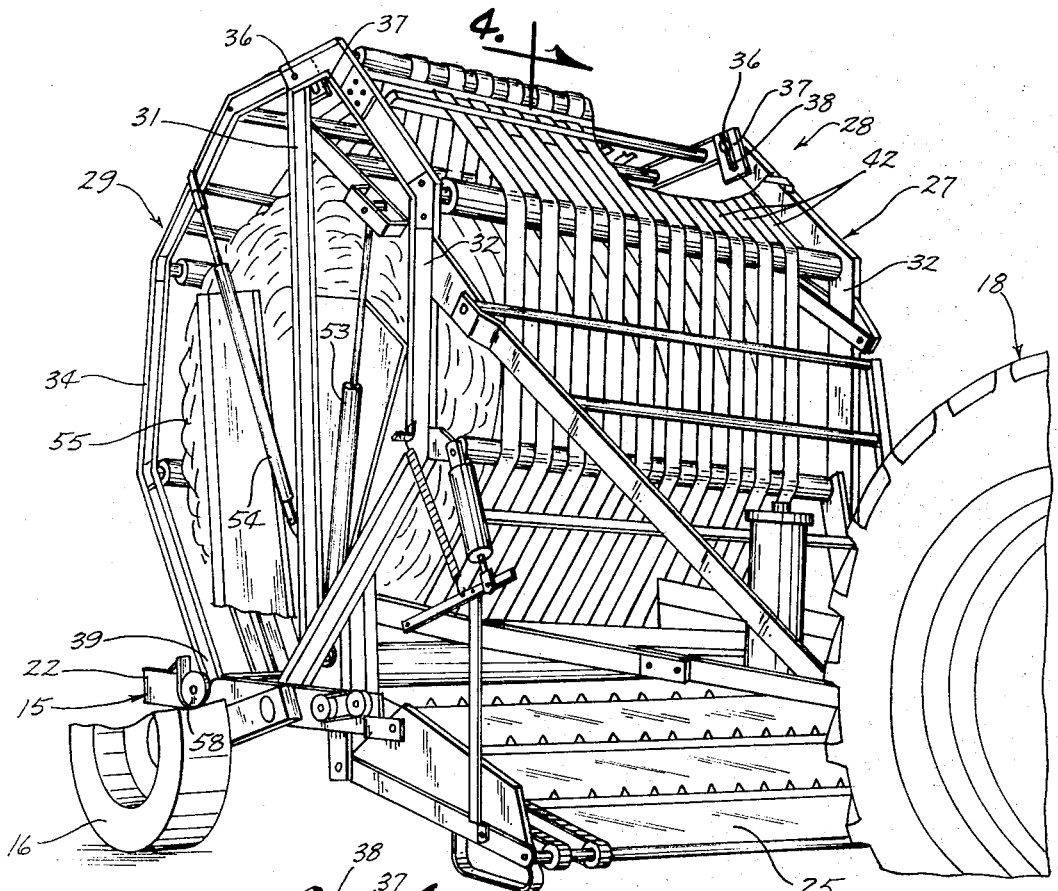
Fig. 1
Fig. 2
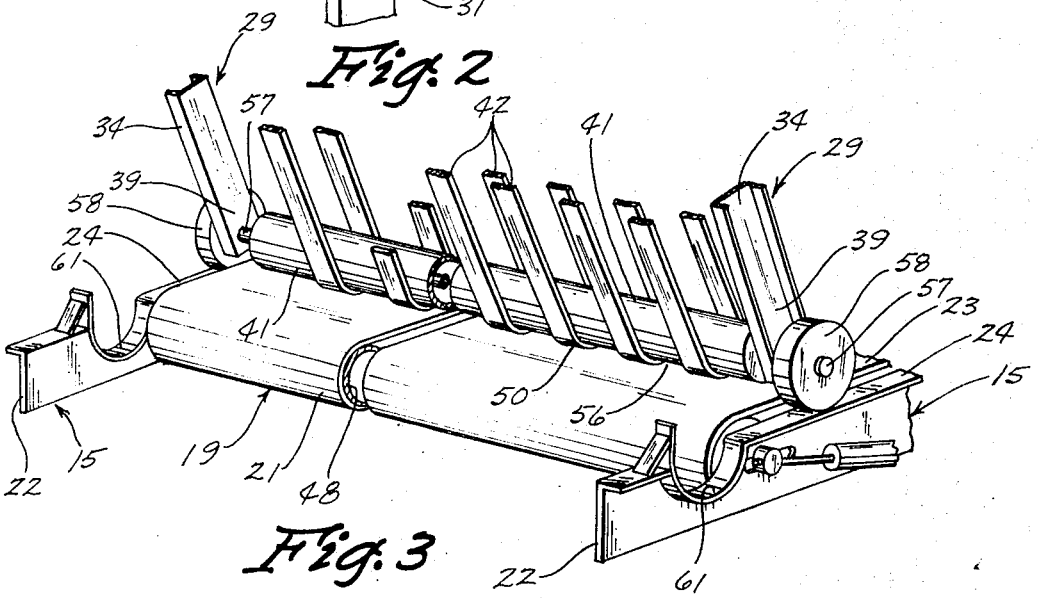
Fig. 3

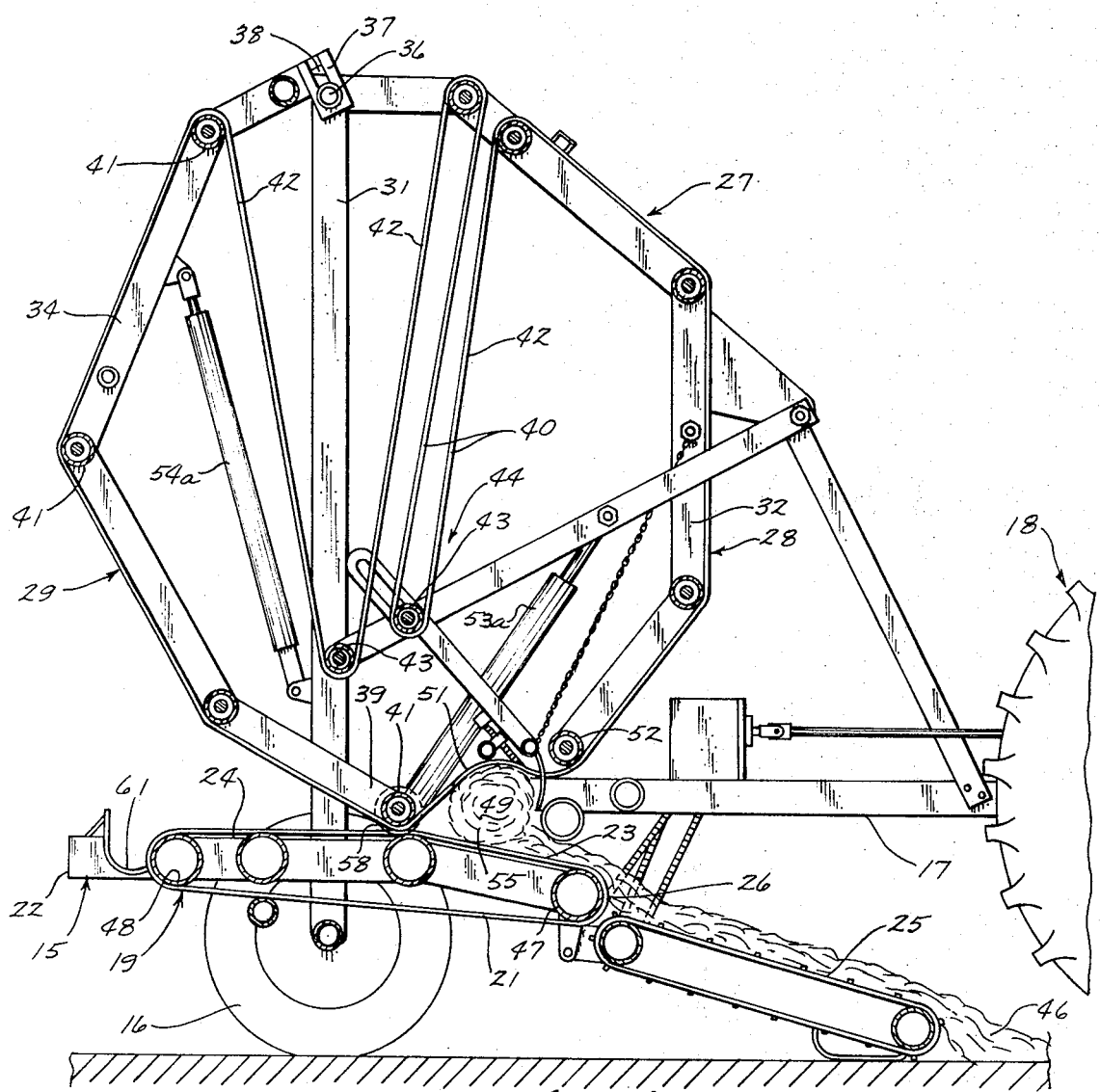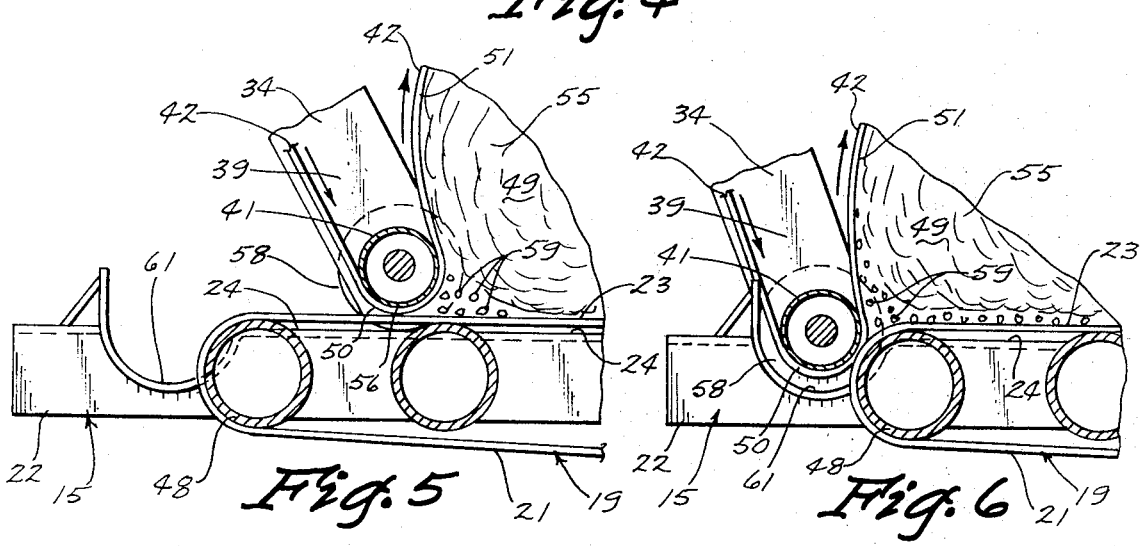

1

MACHINE FOR FORMING A ROUND BALE OF A WINDROWED MATERIAL

SUMMARY OF THE INVENTION

The invention provides a machine of a rugged construction and efficient in operation to form a large cylindrical bale of a uniform high density with a minimum waste of material. In rolling a bale during the bale forming operation, and in wrapping twine about the bale on completion of such operation, there is a tendency of the hay material to break off and to shed leaf portions thereof. Since the leaves often contain substantial amounts of protein the feeding value of the hay is materially increased when the leaf portions are retained in the bale. By maintaining the bale-forming belts in a contiguous relation during and after the bale forming operation, leaf and fragmentary hay portions are maintained in the baling zone and wrapped within the bale.

BRIEF DESCRIPTION OF THE DRAWINGS

FIG. 1 is a front perspective view of the bale forming machine of this invention shown in assembly relation with the rear portion of a tractor; with some parts broken away to more clearly show its construction;

FIG. 2 is an enlarged fragmentary detail perspective view showing the pivotal connection between a pivoted frame structure and a stationary frame structure which support a continuous and extensible belt assembly that forms part of the bale forming and compacting apparatus;

FIG. 3 is an enlarged detail perspective view showing the operative relation of the lower rear end of the continuous belt assembly with the rear end of a horizontal material receiving conveyor;

FIG. 4 is a sectional view on the line 4—4 in FIG. 1, showing parts of the machine in their relative positions for initiating a bale forming operation;

FIG. 5 is an enlarged sectional detail view showing the position of the lower rear end of the continuous belt assembly with the horizontal material receiving conveyor during a bale forming operation;

FIG. 6 is illustrated similar to FIG. 5 and shows the position of the lower rear end of the continuous belt assembly relative to the horizontal material receiving conveyor at the completion of a bale forming operation;

DETAIL DESCRIPTION OF THE INVENTION

Figure 7:
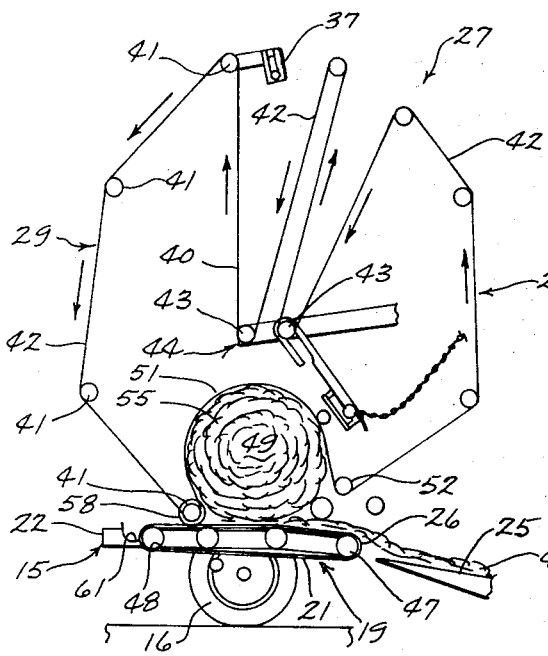
FIG. 7 is a diagrammatic illustration showing parts of the machine in their relative positions corresponding to the position of the parts shown in FIG. 5.

The round bale forming machine of this invention is an improvement on the machine shown in U.S. Pat. No. 3,722,197 and includes a portable frame 15 (FIG. 1) having a pair of ground wheels 16 and a tongue structure 17 connectible in any suitable manner with a draw bar (not shown) of a usual farm tractor designated generally at 18. An endless conveyor unit 19 (FIGS. 1 and 3) is movably supported on and extends longitudinally of the frame 15 and includes a single continuous belt 21 of a width substantially equal to the width or transverse dimension of the frame 15. The belt 21 is arranged between a pair of transversely spaced frame side members 22 with its upper run or surface 23 substantially in the plane of the upper surfaces 24 of the frame members 22. Projected forwardly of the frame 15 and below the tongue structure 17 is a pick up device 25 for gathering a windrowed fibrous material for delivery to the forward end 26 of the conveyor unit 19.

Mounted on the frame 15 (FIG. 1) is an upright transversely extended cage structure 27 that is comprised of a pair of upright frame sections 28 and 29 hereinafter referred to as the front stationary frame unit and a rear pivoted frame unit, respectively. The cage structure 27 (FIG. 4) is of a generally polygonal shape in transverse cross section with the frame units 28 and 29 relatively constructed to form mating half sections of the cage structure when the rear pivoted frame unit 29 is in its closed position relative to the front frame unit 28, as shown in FIG. 4.

The front stationary frame unit 28 (FIGS. 1 and 4) includes a pair of transversely opposite vertical support members 31 secured at their lower ends to the frame 15. Corresponding to each vertical support member 31 is a generally upright member 32 of a C-shape. The upper terminal ends of the C-shape members 32 are rigidly secured to corresponding top portions of corresponding vertical support members 31 and their lower terminal ends to transversely opposite portions of the frame 15.

The rear pivoted frame unit 29 includes a pair of transversely spaced upright C-shape members 34 corresponding to and arranged in the vertical planes of the front C-shape members 32 so that the C-members 32 and 34 are open to each other. The upper end of each rear C-shape member 34 is movably connected at 36 to the rear upper end of a corresponding front C member 32 for translatory pivotal movement relative to the pivot 36. Thus, as shown in FIG. 2, the upper end of each rear C-shape member 34 terminates in a downwardly and forwardly projected extension 37. A longitudinally extended slot 38 in the extension 37 receives a slidable engagement the pivot 36 which is secured to and projects inwardly from a vertical support member 31 at a position adjacent the top thereof. The rear C-shape members 34 are thus supported for translatory pivotal movement about a common axis extended transversely of the frame 15 to provide for a linear horizontal movement of their lower ends 39 in a path adjacent the conveyor 19 for a purpose to appear later.

The C-shape members 32 and 34 rotatably carry a series of transversely extended belt supporting rollers with one of such rollers, indicated as 41, located between the lower ends 39 of the rear C-shape members 34. As shown in FIG. 1, a series of flat belts 42 are trained about all of the rollers on the cage structure 27 in a spaced relation transversely of the portable frame 15. Each of the belts 42 is continuous and of a greater length than the circumferential length of the cage structure 27 when in its closed position. Referring to FIG. 4, it is seen that the additional circumferential length or slack 40 of the belts 42 are traversible about a pair of rollers 43 that form part of a belt tensioning unit 44.

In the initiation of a bale forming operation, and as the tractor 18 is advanced, the windrowed material, indicated at 46 in FIG. 4, is picked up and moved rearwardly by the pick up device 25 for delivery to the front end 26 of the rearwardly moving conveyor belt 21. The conveyor 19 has front and rear rollers 47 and 48, respectively, operatively associated with the belt 21. The material 46 is carried by the belt 21 (FIG. 4) into a bale forming zone 49 defined by the upper run 23 of the belt 21; and those portions 51 of the belts 42 that are located between the rollers 41 and a lowermost roller 52 on the front C-shape members 32.

As the bale 55 in the bale forming zone 49 is progressively increased, the belt portions 51 are correspondingly increased by the action of the belt tensioning unit 44 whereby the belt portions 51 are permitted to travel about the greater part of the peripheral surface of the bale 55 to provide a round bale that is compact and of uniform high overall density. The belt portions 51 are expanded about the bale against the pre-determined continuous pressure applied on the tensioning unit 44 and rear frame 29 by pairs of cylinder assemblies 53 and 53a, and 54 and 54a. The cylinders 53 and 53a form part of the belt tensioning unit 44. The cylinders 54 and 54a along with maintaining a predetermined continuous pressure on the rear frame 29 has the additional function of moving the rear frame 29 to the open and closed positions therefor relative to the front frame 28.

For a more detailed description of the construction and operation of the bale forming machine, reference is made to U.S. Pat. No. 3,722,197. In the machine of such patent, the rear C-shape members 34 are pivotally connected to the rear ends of front C-shape members 32 so that the lower roller 41, on movement of the rear frame 29 relative to the front frame 28, followed an arcuate path relative to the upper surface 23 of the conveyor belt 21. As a result on opening movement of the rear frame 29 relative to the front frame 28 the roller 41 was progressively moved vertically away from the conveyor belt 21 so as to progressively increase the space or working clearance between the conveyor and those portions 50 of the belts 42 trained about the lower side 56 of the roller 41. Thus, any leaves or fragmentary lengths that are broken away or shed from the windrowed material 46 due to the travel of the belt 21 and continuous belts 42 about the bale 55 being formed are carried by the conveyor 21 out of the bale forming zone 49 for discharge to the ground. Since this material often contains proteins of value for livestock feeding purposes, it is desirable that it be retained within the bailing zone 49 for incorporation in the bale being formed.

In the present invention, and as previously mentioned, the pivot and slot connection 36-38 of the front C-shape members 32 with the rear C-shape members 34 provides for a translatory pivotal movement of the roller 41 relative to the pivot 36 in a horizontal path adjacent to the upper run 23 of the belt 21. As shown in FIG. 3, the roller 41 has a stub shaft 57 at each end thereof projected laterally outwardly from an adjacent rear C-shape member 34. Each stub shaft 57 rotatably supports a wheel 58 which is in rolling engagement with the upper surface 24 of an adjacent corresponding frame side member 22. The wheels 58 are of a diameter relative to the diameter of the roller 41 such that the underside 56 of the roller 41, and in turn those portions 50 of the belts 42 at such roller underside, are retained in a close working clearance relation with thhe upper run 23 of the belt 21.

Thus, as shown in FIGS. 5 and 7, with the belts 42 and 21 moving in the directions indicated by the arrows in such figures, any fragmentary portions, indicated at 59, of the windrowed material 46 are carried by the upper run 23 of the belt 21 into the belt portions 51 for movement upwardly between the outer peripheral surface of the bale 55 and the belt portions 51. The fragmentary portions 59 are thus continuously collected on the belt 21 and fed or returned into the bale forming zone 49 by the belts 42.

Figure 8:
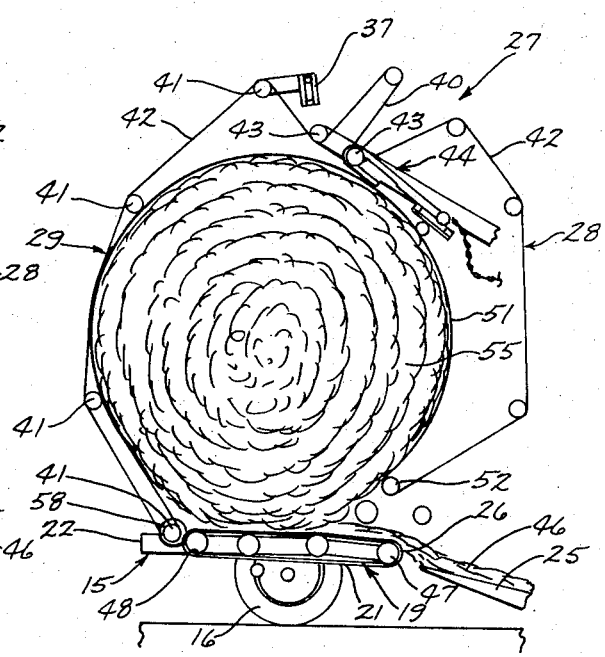
FIG. 8 is a diagrammatic illustration showing relative positions of parts of the machine corresponding to the position of the parts shown in FIG. 6.

This cooperating pick up action of the fragmentary portions 59 by the belts 21 and 42 is maintained during the complete baling operation at the termination of which the wheels 58 are dropped into corresponding arcuate pockets 61 formed in the upper surfaces 24 of the frame sidemembers 22 at positions adjacent to the conveyor rear roller 48 (FIGS. 6 and 8). With the wheels 58 received within the pockets 61 the belt portions 50 are located below the level of the upper run 23 of the belt 21 and in contact engagement with the belt 21. The fragmentary portions 59 of the windrowed material 46 are thus positively prevented from being discharged to the ground from the rear end of the conveyor 19. With the wheels 58 in the pockets 61, the pick up device 25 is elevated and the tractor 18 brought to a stop. With the belts 21 and 42 continued in operation, any loose fragments 59 on the conveyor belt 21 are incorporated into the bale 55 after which twine (not shown) is wrapped about the bale.

Figure 9:
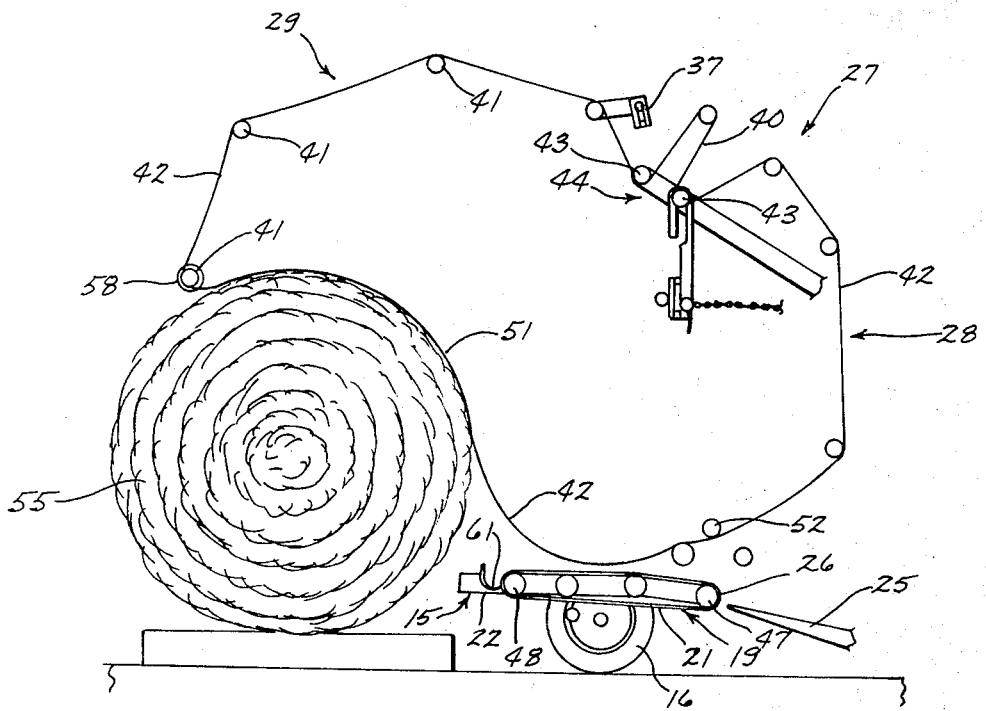
FIG. 9 is a diagrammatic illustration showing relative positions of parts of the machine when the formed bale is to be released from the machine.

With the bale forming operation completed, operation of the belts 21 and 42 is discontinued and the cylinders 54 and 54a are extended to pivotally move the rear frame 29 to its open position relative to the front frame 28 illustrated in FIG. 9. In such open position of the rear frame 29, the roller 41 is located at a height providing for the travel of the completed bale 55 thereunder. The conveyor 19 is then again operated to provide for the discharge of the completed bale therefrom onto the ground.

The bale forming machine of this invention is thus seen to be efficient in operation to form a large round bale in one continuous operation with a minimum loss of any portions of the windrowed material that may be broken away or shaken loose from the windrowed material during a baling operation.

Although the invention has been described with respect to a preferred form thereof, it is to be understood that it is not to be so limited since changes can be made therein which are within the full intended scope of this invention as defined by the appended claims.

I claim:

1. A machine for forming a round bale of windrowed fibrous material comprising:
   a. a portable frame,
   b. a first continuous belt movably supported on said frame for movement longitudinally thereof and including a linear upper run;
   c. a series of continuous belts movably supported on said frame above said first belt for travel longitudinally and vertically relative to said frame, said series of belts having lower runs adjacent the upper run of said first belt,
   d. means on said frame for picking up and delivering a windrowed fibrous material to one end of the upper run of said first belt for travel between said upper run and lower runs, e. means on said frame for confining the delivered material between selected opposite portions of said upper run and lower runs, f. means for moving said upper run of the first belt in a direction opposite to the direction of movement of the lower runs of said series of belts whereby the material confined between said upper run and lower runs is rotated to form a round bale, g. means movably supporting said series of belts on said frame including a pair of rollers with a first roller of said pair of rollers extending transversely of and adjacent to the upper run of said first belt, h. means supporting said first roller on the frame for movement in a horizontal path adjacent the upper run of said first belt to a stop position wherein said first roller is located outwardly from and adjacent the other end of said upper run with the bottom side portion thereof below the plane of said upper run, i. a second roller of said pair of rollers extended transversely of and adjacent to the upper run of said first belt at a position between said first roller and said pickup means, j. said confining means including said first and second rollers which cooperate to hold the bale being formed against movement longitudinally of said upper run, and k. coacting means on said frame and on said first roller for defining said stop position of said first roller.

2. The machine for forming a round bale according to claim 1 wherein:

a. said coacting means includes a pair of transversely spaced track members on said portable frame arranged at opposite sides of said first belt, b. a pair of wheels corresponding to said track members and ridable thereon, and c. means rotatably mounting said wheels at opposite ends of said first roller in axial alignment with said first roller, d. said track members having terminal sections projected outwardly from the other end of said upper run, each of said terminal sections having an upper surface formed with a recessed portion for receiving a corresponding wheel therein, and each recessed portion and corresponding wheel being of a relative size and shape so that when a wheel is within a corresponding recessed portion said first roller is in the stop position therefor.

3. A machine for forming a round bale of a windrowed fibrous material comprising:

a. a portable frame including a pair of transversely spaced side members, b. a conveyor means mounted on and extended longitudinally of said portable frame and between said side members with the upper surface of said conveyor means and the top surfaces of said side members lying in substantially a common plane, said side members having extensions projected outwardly beyond one end of said conveyor means, c. means on said frame for picking up and delivering the windrowed fibrous material onto said conveyor means at the other end thereof, d. a pair of longitudinally spaced rollers on said frame extended transversely of and adjacent the upper surface of said conveyor means to define therebetween a bale forming zone, e. means supporting a first one of said rollers on said frame for movement in a horizontal path adjacent said upper surface toward and away from the second one of said rollers including a pair of wheels corresponding to said side members and mounted at opposite ends of said first roller in axial alignment therewith for riding engagement on the top surface of a corresponding side member, f. said side member extensions having transversely opposite pockets formed in the top surfaces thereof adjacent to and outwardly from said one end of the conveyor means, said pockets of a size to receive a corresponding wheel therein, g. a series of continuous belts supported on said portable frame for travel in an upright plane extended longitudinally of said conveyor means, said belts having lower portions trained about the lower portions of said pair of rollers engageable with the material moved by the conveyor means into said bale forming zone, h. means for moving the lower portions of said belts in a direction opposite to the direction of the upper surface of said conveyor means whereby material in said bale forming zone is rotated between the lower portions of said belts and upper surface to form a round bale, and i. means for extending said lower belt portions upwardly between said pair of rollers for travel about the upper peripheral portion of a bale being formed concurrently with the movement of said first roller away from said second roller to a stop position defined by the dropping of said wheels into said pockets.

4. A machine for forming a round bale of a windrowed fibrous material comprising:

a. a portable frame, b. means at one end of said frame for picking up the windrowed fibrous material, c. a conveyor means on said frame for receiving material from said pickup means for movement toward the other end of said frame, d. a frame assembly including a pair of upright frame structures extended transversely of and above said conveyor means, e. means rigidly mounting a first one of said frame structures on said portable frame at said one end thereof, f. means pivotally connecting together the upper ends of said two frame structures for pivotal translatory movement of the second one of said frame structures to open and closed positions relative to said first frame structure, said frame structures relatively constructed such that when said second frame structure is pivotally moved to the closed position therefor said frame assembly is of a generally polygonal shape in side elevation, g. a plurality of continuous belts rotatably supported for movement about said frame assembly, said belts spaced transversely of said conveyor means and each of said belts having the lowermost portions thereof adjacent said conveyor means when the second frame structure is in the closed position therefor, h. a roller corresponding to and mounted at the lower end of each frame structure, said pair of rollers extended transversely of and adjacent to said conveyor means and defining the lowermost portions of said belts, said belts engageable with the lower side portions of said rollers, i. means on said frame for confining the fibrous material in a bale forming zone located between selected opposite portions of said conveyor means and said belts and between said pair of rollers, and j. coacting means on said portable frame and said second frame structure for guiding the movement of the roller on said second frame structure in a horizontal path adjacent the upper surface of said conveyor means to a completed bale forming position wherein said roller on the second frame structure is located outwardly from and adjacent the other end of the conveyor means with the lower side portion thereof below the upper surface of the conveyor means.

* * * * *